(12) United States Patent
Takahashi

(10) Patent No.: US 6,764,790 B2
(45) Date of Patent: Jul. 20, 2004

(54) LITHIUM SECONDARY BATTERY

(75) Inventor: Michio Takahashi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 41 days.

(21) Appl. No.: 10/037,409

(22) Filed: Jan. 4, 2002

(65) Prior Publication Data

US 2002/0122767 A1 Sep. 5, 2002

Related U.S. Application Data

(62) Division of application No. 09/495,065, filed on Jan. 31, 2000, now abandoned.

(30) Foreign Application Priority Data

Feb. 5, 1999 (JP) .............................................. 11-29013

(51) Int. Cl.[7] .......................... H01M 4/50; C01G 45/00; C01D 15/00
(52) U.S. Cl. ........................................ 429/224; 423/599
(58) Field of Search .................... 423/599; 29/623.1; 429/224

(56) References Cited

U.S. PATENT DOCUMENTS

| | | | |
|---|---|---|---|
| 5,700,597 A | 12/1997 | Zhong et al. | |
| 5,948,565 A | 9/1999 | Kelder | |
| 6,007,947 A | * 12/1999 | Mayer | ........................ 429/224 |
| 6,040,089 A | 3/2000 | Manev et al. | |
| 6,114,064 A | 9/2000 | Manev et al. | |
| 6,117,410 A | * 9/2000 | Ogihara et al. | .............. 423/599 |
| 6,267,943 B1 | * 7/2001 | Manev et al. | ................ 423/599 |

FOREIGN PATENT DOCUMENTS

| | | |
|---|---|---|
| EP | 0 279 235 A1 | 8/1988 |
| EP | 0 728 701 A1 | 8/1996 |
| FR | 2 776 649 | 10/1999 |
| JP | 08-222219 | 8/1996 |
| JP | 10-021910 | 1/1998 |
| JP | 10-182159 A | 7/1998 |
| JP | 10-245230 | 9/1998 |
| JP | 10-321227 | 12/1998 |
| JP | 11-302020 | 11/1999 |
| WO | 97/20773 | 6/1997 |

OTHER PUBLICATIONS

Thackeray, et al., Lithium Insertion into Manganese Spinels, Mat. Res. Bull., vol. 18, pp. 461–472, Apr., 1983.*

* cited by examiner

Primary Examiner—Steven Bos
(74) Attorney, Agent, or Firm—Burr & Brown

(57) ABSTRACT

A lithium secondary battery using a lithium manganese oxide for a positive active material having a cubic spinel structure which has a crystallite size of 58 nm or greater and/or a lattice distortion of 0.09% or less. The ratio of Li/Mn in the lithium manganese oxide is preferably greater than 0.5. In synthesizing the lithium manganese oxide, a mixed compound including salts and/or oxides of each of the elements is fired in an oxidizing atmosphere in a range of 650° C. to 1000° C. for 5 to 50 hours, with the properties of the crystal being improved by firing two or more times, preferably with an increase in firing temperature over the temperature of the previous firing.

6 Claims, 1 Drawing Sheet

LITHIUM SECONDARY BATTERY

CROSS REFERENCE TO RELATED APPLICATION

This application is a division of U.S. patent application Ser. No. 09/495,065, filed Jan. 31, 2000, now abandoned the entirety of which is incorporated herein by reference.

FIELD OF THE INVENTION

This invention pertains to a lithium secondary battery with good charge-discharge cycle characteristics which has low internal resistance, and in particular, to a battery which uses a lithium manganese oxide for a positive active material and is intended for use as a power source for portable electronic devices, electric vehicle motors, hybrid electric vehicle motors, and the like.

BACKGROUND OF THE INVENTION

Reduction in size and weight of portable electronic devices such as portable telephones, camcorders, and lap top computers has proceeded rapidly in recent years. Secondary batteries have come into use for such devices, and use a lithium transition metal compound as a positive active material, a carbon material as a negative material, and an electrolyte which dissolves lithium ion electrolyte in an organic solvent.

Such batteries are generally called lithium secondary (or rechargeable) batteries or lithium ion batteries, and due to their great energy density and the fact the cell voltage is high at around 4 V, they are attracting attention as power sources for electric vehicles (hereinafter referred to as "EV") and hybrid electric vehicles (hereinafter referred to as "HEV"). With the present concern over environmental problems, these types of vehicles are becoming known to the general public as low pollution vehicles.

The battery capacity and charge-discharge cycle characteristics (hereinafter referred to as "cycle characteristics") of lithium secondary batteries like these depend largely on the properties of the material used in the positive active material. The lithium transition metal compound uses a positive active material such as lithium cobalt oxide ($LiCoO_2$), lithium nickel oxide ($LiNiO_2$), and lithium manganese oxide ($LiMn_2O_4$).

Of these, $LiMn_2O_4$ is an inexpensive raw material, has high output density, and can handle high voltages. However, its discharge capacity decreases gradually with repeated charging-discharging cycles, and good cycle characteristics are difficult to obtain. However, these disadvantages are being slowly overcome as studies of crystal structure and composition have proceeded in recent years.

Regardless of the type of positive active material used in a lithium secondary battery, reducing the electrical resistance of the positive active material should reduce the internal resistance of the battery. That is, improving the conductivity of the positive active material is the most important matter from the standpoint of improving the characteristics of the battery. Reducing the internal resistance of the battery is very important in order to obtain the large current output necessary for EV's and HEV's to accelerate and climb steep grades, as well as for improving the charging-discharging efficiency.

As one means of solving this problem in the past, fine conductive particles of such materials as acetylene black have been added to the positive active material to improve conductivity and reduce the internal resistance of the battery. However, the addition of acetylene black is a problem in that it reduces the battery capacity by reducing the amount of positive active material that can be used. In addition, since acetylene black is a type of carbon and a semiconductor, it is believed that there are limits as to how much electronic conductivity will improve. Furthermore, acetylene black is voluminous and is difficult to handle in the fabrication of electrode plates. Thus, although adding acetylene black has the advantage of reducing internal resistance, it has the disadvantage of reducing the battery capacity. The proper proportion of acetylene black is known in the prior art due to its ease of manufacture and comparison with other attempted solutions.

SUMMARY OF THE INVENTION

In accordance with the present invention, a lithium secondary battery uses a lithium manganese oxide for a positive active material having a cubic spinel structure which has a crystallite size of 58 nm or greater and/or a lattice distortion of 0.09% or less. The ratio of Li/Mn in the lithium manganese oxide is preferably greater than 0.5.

In accordance with a preferred method for synthesizing the lithium manganese oxide, a mixed compound, including salts and/or oxides of each of the elements, is fired in an oxidizing atmosphere in a range of 650° C. to 1000° C. for 5 to 50 hours. The properties of the resultant crystal are improved by firing two or more times, preferably with an increase in firing temperature over the temperature of the previous firing.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE PREFERRED EMBODIMENT

Figure 1:
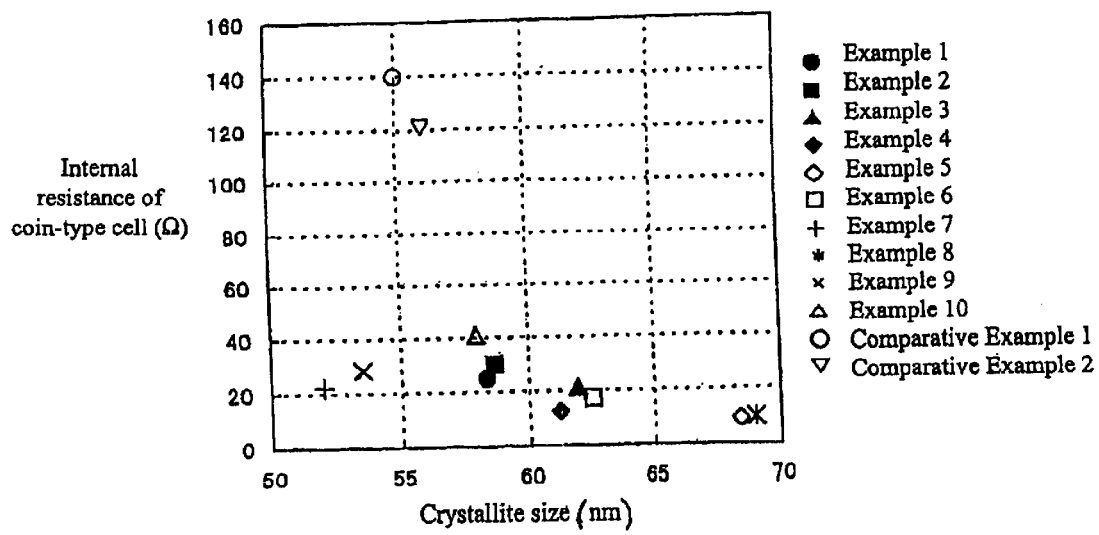
FIG. 1 is a graph showing the relationship between crystallite size and internal resistance of coin-type cells.

In the lithium secondary battery of this invention, lithium manganese oxide having a cubic spinel structure is used as positive active material. A stoichiometric composition of the lithium manganese oxide having a cubic spinel structure is expressed as $LiMn_2O_4$, but this invention is not restricted to this stoichiometric composition and $LiM_xMn_{2-x}O_4$, which substitutes a different element M for a portion of the transition element Mn, is optionally used, where "x" represents the quantity of the substitution. When elements have been substituted in this fashion, the ratio of Li to Mn, when a portion of Mn is substituted for Li and there is an excess, stoichiometrically speaking, of Li, becomes $(1+x)(2-x)$ and when substituted by an element M other than Li, the ratio becomes $1/(2-x)$, so that preferably the Li/Mn ratio is >0.5.

Substitution elements M may be Li, Fe, Mn, Ni, Mg, Zn, B, Al, Co, Cr, Si, Ti, Sn, P, V, Sb, Nb, Ta, Mo or W. Among the substitution elements M, Li theoretically is an ion which has a valence of +1, Fe, Mn, Ni, Mg and Zn have a valence of +2, B, Al, Co and Cr have a valence of +3, Si, Ti and Sn have a valence of +4, P, V, Sb, Nb, and Ta have a valence of +5, and Mo and W have a valence of +6. While they are elements in solid solution in $LiMn_2O_4$, Co and Sn may have a valence of +2, Fe, Sb and Ti may have a valence of +3, Mn may have valences of +3 and +4, and Cr may have valences of +4 and +6. Thus, each type of substitution elements M may exist in a state having a compound valence and it is not necessary for the quantity of oxygen to be 4 as is expressed in theoretical chemical compositions. Within the limits for maintaining crystal structure, it does not matter if oxygen is deficient or excessive.

Thus, in this invention, when using a $LiMn_2O_4$ spinel like this, a crystallite size of 58 nm or greater is used. As the example of application below shows, when this condition is fulfilled, the resistance of the positive active material decreases and the battery characteristics improve. Crystallite as used herein refers to microscopically or ultra-microscopically small monocrystals and the size thereof is a value that can be obtained by analyzing a diffraction pattern obtained by powder X-ray diffraction using the Wilson method. More specifically, the crystallite size in this invention is determined using Rigaku Denki Ltd.'s RINT 2000 series application software "Crystallite Size and Lattice Deformation Analysis," Version 3, Oct. 16, 1996.

When using a $LiMn_2O_4$ spinel, it is preferable to use a material with a lattice distortion of 0.09% or less. If this condition is also fulfilled, then the internal resistance of the battery can be reduced even further. Lattice distortion as used herein refers to instances where the lattice is abnormal, i.e., where the crystal lattice is irregular due to defects in a portion of the crystal or external force. This lattice distortion can be determined by using the Wilson method.

Thus, when the crystallite size and lattice distortion are determined by another method of analysis and differ from the value determined by this invention, the import of this invention is not influenced by these differences in methods of analysis. When both the crystallite size and lattice distortion fulfill the conditions mentioned earlier, the effect on the battery characteristics are manifested very strongly and the internal resistance of the battery effectively decreases.

The method of synthesizing the $LiMn_2O_4$ spinel which has the crystallite size and/or the lattice distortion described earlier will now be explained. The salts and/or oxides of each element (including the substitution elements M when replacing a portion of Mn) are used for the synthesizing material. While there are no restrictions on the salts or oxides of each element, it is preferred to use starting materials having a high degree of purity. Also, using carbonates, hydroxides and organic acids which do not give off harmful decomposition gases is preferred. However, nitrates, hydrochlorides, and sulfates may be used. With respect to lithium compounds, $Li_2O$ is preferably not used since it is chemically unstable. Optimally, hydroxides and carbonates are used.

These materials, mixed in designated proportions, are initially fired for a period of 5 to 50 hours at a temperature of 650° C. to 1000° C. in an oxidizing atmosphere. "Oxidizing atmosphere" generally refers to an atmosphere which has oxygen pressure in which the specimen in the furnace causes an oxidation reaction, and more specifically, corresponds to an atmosphere of air or oxygen.

After this initial firing, the uniformity of composition is not necessarily good, and the crystallite size tends to be small with large lattice distortion. However, when the ratio of Li/Mn satisfies the condition of being greater than 0.5, i.e., when a portion of Mn is substituted by substitution elements, particularly when an excess of Li is formed by replacing a portion of Mn with Li and Ti, it has been confirmed by tests that the crystallite size and lattice distortion easily satisfy the specified conditions with one firing. The reason for this is not clear, but crystal lattice stabilization is sought by adding substitution elements M, and it is presumed that the phase atmosphere of synthesis changes due to an atmosphere conducive to crystal growth, for example, liquid phase atmosphere or gas phase atmosphere.

In this way, the crystallite size and/or lattice distortion related to the composition can meet the specified conditions with one firing but it is preferable to perform a number of firing steps in order to reduce nonuniformity of the composition for synthesis. In this case, it is even more preferable from the standpoint of uniformity of composition to pulverize after the first firing and then to perform the second and subsequent firings. The number of firings largely depends on the firing temperature and the firing time. When the firing temperature is low and/or the firing time is short, many firing steps are required. From the standpoint of uniformity of composition, depending on the type of substitution element M, there are instances when it is preferable to increase the number of firings. These are cases when it is thought to be difficult to have a phase atmosphere suitable to the growth of the crystal due to the addition of substitution elements M.

However, since increasing the number of firings means lengthening the production process, it is preferable that the number of firings is limited to the minimum necessary. With specimens obtained by performing multiple firings, it is possible to confirm that there is an improvement in crystallinity over specimens that have been obtained from one firing from observing the sharp protrusion of the peak configuration on the XRD charts.

Pulverization processing is performed after each firing with no limitations on how it is done. For example, ball mill, vibrating mill, and air current pulverizing machines may be used. Pulverization processing contributes to uniformity of particle size, and in order to obtain sufficient uniformity of composition, pulverization processing should preferably be performed so that average particle size is 10 $\mu$m or less. The average particle size in this case is obtained by measuring ultrasonically dispersed particles in distilled water with the laser diffraction method.

When the firing temperature is less than 600° C., a peak indicating a residue of raw materials is observed on the XRD chart of the fired product. For example, when lithium carbonate ($Li_2CO_3$) is used as a source of lithium, a peak for $Li_2CO_3$ is observed, and no single-phase products can be obtained. On the other hand, when the firing temperature is greater than 1000° C., a high temperature phase is produced in addition to the intended crystal system and a single phase product can no longer be obtained.

As explained above, using the $LiMn_2O_4$ spinel which satisfies the conditions of this invention improves the electric conductivity characteristics of the positive active material as well as the state of dispersion of fine powders, such as acetylene black, which are added as aids to conductivity and internal resistance of the battery. Since this suppresses the generation of Joule heat due to the charging-discharging cycle of the battery, the thermal load on the active material and electrolyte is lessened, charging and discharging efficiency is enhanced, and the cycle characteristics are improved. Thus, the present invention suppresses the decrease in battery capacity that occurs over time due to repeated chargings and dischargings. It also makes it possible to decrease the amount of acetylene black used and other additives.

The reduction of internal resistance, the maintenance of positive capacity, and the improvement in cycling characteristics are particularly noticeable in large capacity batteries which use large amounts of electrode active material. Thus, it can be used, for example, for the power source for EV and HEV motors while maintaining driving performance for proper acceleration and climbing steep grades. It also has the effect of enabling continuous long distance travel on one charging. This invention is also applicable to low capacity batteries such as coin-type batteries, and the like.

There are no particular restrictions on other materials that may be used in the manufacturing of batteries, and various publicly known types of materials used in the past may be used. For example, amorphous carbon materials, such as soft carbon and hard carbon, and artificial graphite, such as highly graphitized carbon or carbon materials, which are natural may be used for the negative active material.

For organic electrolytes, one or more types of lithium fluoride complex compounds such as $LiPF_6$ and $LiBF_4$, lithium halogenides such as $LiClO_4$, electrolytes dissolved in carbonic esters such as ethylene carbonate (EC), diethylcarbonate (DEC), dimethylcarbonate, propylene carbonate (PC), a single solvent or compound solvents of organic solvents such as γ-butyrolactone, tetrahydrofuran, and acetonitrile, etc. may be used.

EXAMPLES

For the synthesis of positive active material $LiMn_2O_4$ spinel, commercially available $Li_2CO_3$ and $MnO_2$ powders were used for the starting raw materials. The raw materials were weighed and mixed to provide the compositions shown in Examples 1–10 and Comparative Examples 1 and 2 in Table 1, and then fired in an oxidizing atmosphere (air) under the conditions of the first firing conditions as noted in Table 1. Samples of the powder obtained from the first firing of Comparative Examples 1 and 2 and Example 10 were taken. In contrast, material from Examples 1–9 were subjected to pulverization processing after the first firing to a mean particle size of 10 μm or less, fired for a second time under the conditions shown in Table 1, and samples taken.

TABLE 1

| Specimen | Composition | First Firing Conditions | Second Firing Conditions |
| --- | --- | --- | --- |
| Example 1 | $LiMn_2O_4$ | 650° C. 10 hours | 800° C. 24 hours |
| Example 2 | $LiMn_2O_4$ | 650° C. 10 hours | 900° C. 24 hours |
| Example 3 | $Li_{1.1}Mn_{1.9}O_4$ | 650° C. 10 hours | 800° C. 24 hours |
| Example 4 | $Li_{1.1}Mn_{1.9}O_4$ | 650° C. 10 hours | 900° C. 24 hours |
| Example 5 | $Li_{1.1}Mn_{1.9}O_4$ | 650° C. 10 hours | 950° C. 24 hours |
| Example 6 | $LiMn_2O_4$ | 650° C. 10 hours | 1000° C. 24 hours |
| Example 7 | $LiMn_2O_4$ | 650° C. 10 hours | 700° C. 24 hours |
| Example 8 | $Li_{1.1}Mn_{1.9}O_4$ | 650° C. 10 hours | 1000° C. 24 hours |
| Example 9 | $Li_{1.1}Mn_{1.9}O_4$ | 650° C. 10 hours | 700° C. 24 hours |
| Example 10 | $Li_{1.1}Mn_{1.9}O_4$ | 800° C. 24 hours | None |
| Comparative Example 1 | $LiMn_2O_4$ | 800° C. 24 hours | None |
| Comparative Example 2 | $LiMn_2O_4$ | 850° C. 24 hours | None |

Crystallite size and lattice distortion of each of the specimens obtained were measured using an X-ray diffraction device having a rotating anode type target (Cu) and a graphite monochrometer (RINT 250 made by Rigaku Denki), with the powder X-ray diffraction method (XRD) with a gonio radius of 185 mm, a divergent slit (DS) of ½°, a scattering slit (SS) of ½°, and a receiving slit (RS) of 0.15 mm. The crystallite size and lattice distortion were determined using the Wilson method from the peak position of $LiMn_2O_4$ spinel appearing at diffraction angle 2θ=10° to 70° under conditions of 50 kV and 300 mA using Cu Kα rays as the X ray source. For determination of peak position and apparatus function, Si monocrystal (SRM640b) was used as an internal standard specimen.

Batteries were prepared as follows. Acetylene black powder, the conductive material, and polyvinylidene fluoride, the binding agent, were mixed in proportions of 50:2:3 (by weight) to prepare the positive material for each type of specimen prepared. An amount of 0.02 g of the positive material was press formed at 300 kg/cm² into a coin shape having a diameter of 20 mm and made into a positive electrode. A coin-type cell was prepared using this positive electrode, having a battery electrolyte prepared by dissolving an electrolyte of $LiPF_6$ dissolved in an organic solvent mixed with equal volumes of ethylene carbonate and diethylcarbonate so that it would be a concentration of 1 mol/L, a negative electrode of carbon, and a separator separating the positive and negative electrodes.

The internal resistance of the cell prepared as described above was measured by conducting one charge-discharge cycle by charging at a constant current of 1 Coulomb and constant voltage of 4.1 V in accordance with the capacity of the positive active material and similarly discharging at a constant current of 1 Coulomb to 2.5 V, and dividing the difference (difference in electrical potential) between the potential at a resting state after finishing charging and the potential immediately after commencement of discharging by the discharging current.

Figure 2:
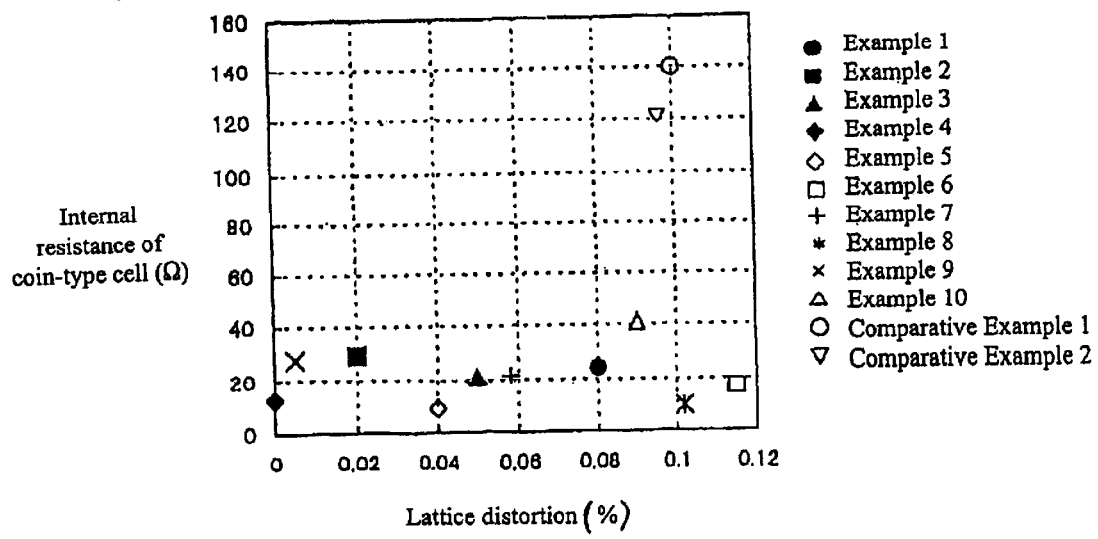
FIG. 2 is a graph showing the relationship between lattice distortion and internal resistance of coin-type cells.

The relationship between the internal resistance of the cell and crystallite size is shown in FIG. 1. The relationship between the internal resistance of the cell and lattice distortion is shown in FIG. 2. In Examples 6 and 8, while the crystallite size is 58 nm or greater, lattice distortion is 0.1% or greater. It is believed that crystal growth was accelerated by raising the firing temperature while conversely making it easy for defects to occur and the lattice distortion increased. In contrast, in Examples 7 and 9, lattice distortion was smaller than 0.09% while crystallite size was 55 nm or less. In this case, in contrast to Examples 6 and 8, it is believed that as the firing temperature was low, it was harder for defects to occur rather than the crystal growth being suppressed.

However, since the internal resistance of the cells is low in Examples 6 through 9 compared with Comparative Examples 1 and 2, it was confirmed that the resistance in the battery decreased either through the crystallite size or the lattice distortion fulfilling the specified conditions.

In addition, it is clear from FIG. 1 that crystallite size is 58 nm or greater and also clear from FIG. 2 that lattice distortion is 0.09% or less with the $LiMn_2O_4$ spinet prepared by two firings in Examples 1–5 regardless of the composition of the $LiMn_2O_4$ spinel, confirming that the internal resistance of the cell decreased. In other words, it is clear that when crystallite size and lattice distortion have specified values, it is possible to make batteries with low internal resistance, the same as when at least either the crystallite size or the lattice distortion fulfill specified conditions.

In contrast to Examples 1–9, when both the crystallite size and lattice distortion do not fulfill the specified conditions, in other words, in Comparative Examples 1 and 2, it was confirmed that the internal resistance of the cell increased. In Example 10, crystallite size was 58 nm and lattice distortion was 0.09%, both values being the border values prescribed by this invention and a low resistance cell was obtained despite just one firing. While this is thought to be due to the effect of the composition of Example 10, by firing Examples 3–5 twice, which had the same composition as Example 10, within the appropriate temperature ranges it was possible to achieve preferred values for crystallite size and lattice distortion which deviated from the border values.

As described above, the superior result of reduction of the internal resistance of batteries can be achieved, and as a result, charging-discharging efficiency and cycle characteristics can be improved with the lithium secondary battery of this invention by using low resistance $LiMn_2O_4$ spinel whose electric conductivity has been improved as a positive active material. In addition, the amount of conductivity enhancing additives can be reduced, leading to improvements in battery capacity and energy density.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed:

1. A method for reducing the internal resistance of a lithium secondary battery that includes a positive active material containing a lithium manganese oxide material having a cubic spinel structure, said method comprising the steps of:

(a) mixing lithium-containing compounds with manganese-containing compounds to form a mixture;

(b) firing said mixture in an oxidizing atmosphere at a temperature of 650° C. to 1000° C. for 5 to 50 hours to form an intermediate material;

c) pulverizing said intermediate material to form a pulverized intermediate material having a mean particle size of 10 μm or less; and d) firing said pulverized intermediate material in an oxidizing atmosphere at a temperature higher than the temperature of step (b) and within a range of 650° C. to 1000° C. for 5 to 50 hours to form a lithium manganese oxide material;

whereby the crystallite size of said lithium manganese oxide material is 58 nm or greater, and wherein the lattice distortion of said final lithium manganese oxide material is 0.09% or less, such that the internal resistsnce of the lithium secondary battery is reduced.

2. The method of claim 1, wherein said lithium manganese oxide material is fired a third time at a temperature higher than the temperature of step (d).

3. The method of claim 2, further comprising at least one pulverization step after step (d), wherein said lithium manganese oxide material is pulverized to form a pulverized intermediate material.

4. The method of claim 3, wherein a mean particle size of said pulverized intermediate material is 10 μm or less.

5. The method according to claim 1, wherein a LiTMn ratio in said lithium manganese oxide material exceeds 0.5.

6. The method according to claim 1, wherein said lithium manganese oxide material comprises at least one of salts and oxides of lithium in combination with at least one of salts and oxides of manganese.

* * * * *

UNITED STATES PATENT AND TRADEMARK OFFICE
CERTIFICATE OF CORRECTION

PATENT NO. : 6,764,790 B2
DATED : July 20, 2004
INVENTOR(S) : Michio Takahashi

It is certified that error appears in the above-identified patent and that said Letters Patent is hereby corrected as shown below:

Column 8,
Line 13, change "resistsnce" to -- resistance --
Line 23, change "LiTMn" to -- Li/Mn --

Signed and Sealed this

Twenty-third Day of November, 2004

JON W. DUDAS
*Director of the United States Patent and Trademark Office*